3,190,906
ALKANE SULFONIC ACID ESTERS SUBSTITUTED IN β-POSITION BY ETHER GROUPS AND THEIR PRODUCTION
Werner Mueller, Harry Distler, and Albert Palm, Ludwigshafen (Rhine), Germany, assignors to Badische Anilin- & Soda-Fabrik Aktiengesellschaft, Ludwigshafen (Rhine), Germany
No Drawing. Filed Sept. 7, 1961, Ser. No. 136,451
Claims priority, application Germany, Sept. 7, 1960, B 59,257
9 Claims. (Cl. 260—456)

This invention relates to the production of substituted alkane sulfonic acid esters which contain an ether group in β-position to the sulfonic ester group.

It is known to prepare 3-ethoxypropylsulfonic acid ethyl ester from propene-(2)-sulfonyl chloride and ethanol in the presence of an excess of potassium hydroxide. It is further known that β-ethoxy-ethanesulfonic acid ethyl ester can be obtained from β-chloroethanesulfonic acid chloride and sodium ethylate. According to these known methods, there are obtained merely alkoxyalkanesulfonic acid alkyl esters in which the alkyl groups of the ester group and the ether group are identical.

The known β-alkoxyalkanesulfonic acid esters have no plasticizer properties for polyvinyl chloride. Neither do mixtures of alkanesulfonic acid esters obtained by sulfochlorination of alkanes and esterification, which are also known, owing to the indefinite chain length of the alkyl radical.

It is an object of this invention to provide new alkanesulfonic acid esters containing an ether group in β-position. It is another object of the invention to provide a process for the production of alkanesulfonic acid esters substituted in β-position by an ether group whose organic radical is different from the organic radical in the ester group. It is another object of this invention to prepare alkanesulfonic acid esters etherified in β-position in which the etherified alkane radical has a definite chain length. It is further an object of this invention to provide a process for the production of new plasticizers for polyvinyl chloride.

These objects are achieved by reacting a vinylsulfonic acid ester of an aliphatic or cycloaliphatic alcohol, phenol or unclear-substituted phenol, the said ester being substituted or unsubstituted on one or both carbon atoms of the vinyl group by alkyl groups, in the presence of a small amount of an alkali or alkaline earth metal alcoholate, dry powdered alkali hydroxide or quaternary ammonium base of the formula:

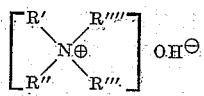

in which R', R" and R''' denote alkyl groups with 1 to 3 carbon atoms and R'''' denotes an aryl radical with 6 to 10 carbon atoms with 5 to 12 carbon atoms in the ring, reacted with an excess amount of an alcohol.

The sulfonic acid esters which may be used as initial materials are derived from vinylsulfonic acid or from vinylsulfonic acids substituted in α- and/or β-position to the sulfonic acid group by alkyl groups, especially methyl, ethyl or propyl groups, as acid components and from alkanols or phenols or naphthols, or phenols or naphthols substituted by inert groups, such as halogen atoms, alkoxy groups or thiocyanate groups, as hydroxy compounds. These esters are readily obtained, for example, from β-chloroethanesulfochloride and a corresponding hydroxy compound by the action of two equivalents of an alkali alcoholate.

It is preferable to use esters which are derived from vinylsulfonic acid, α-methylvinylsulfonic acid and 1-propenesulfonic acid and from phenols or naphthols which may contain one to three inert atoms or groups, such as alkyl groups with 1 to 4 carbon atoms, alkoxy groups with one to three carbon atoms, halogen atoms, i.e., fluorine, chlorine, bromine or iodine, or thiocyanate groups.

For example the following may be used:

Vinylsulfonic acid methyl ester,
α-Methylvinylsulfonic acid methyl ester,
α-Ethylvinylsulfonic acid methyl ester,
1-propene-1-sulfonic acid methyl ester,
2-methyl-1-propene-1-sulfonic acid methyl ester,
Vinylsulfonic acid butyl ester,
Vinylsulfonic acid phenyl ester,
Vinylsulfonic acid α-naphthyl ester,
Vinylsulfonic acid β-naphthyl ester,
Vinylsulfonic acid-[5,6,7,8-tetrahydronaphthyl-(1)] ester,
Vinylsulfonic acid o-cresyl ester,
Vinylsulfonic acid p-cresyl ester,
Vinylsulfonic acid (p-tert.-butylphenyl) ester,
Vinylsulfonic acid (2,6-di-tert.-butyl-4-methylphenyl) ester,
Vinylsulfonic acid p-dodecylphenyl ester,
Vinylsulfonic acid p-methoxyphenyl ester,
Vinylsulfonic acid p-ethoxyphenyl ester,
Vinylsulfonic acid p-butoxyphenyl ester,
Vinylsulfonic acid o-chlorophenyl ester,
Vinylsulfonic acid o-bromophenyl ester,
Vinylsulfonic acid p-iodophenyl ester,
Vinylsulfonic acid p-fluorophenyl ester, and
Vinylsulfonic acid p-thiocyanophenyl ester.

The reaction succeeds with a great variety of alcohols. For example saturated and unsaturated, linear and branched primary, secondary and tertiary monoalcohols, especially those with up to 20 carbon atoms, may be used, such as methanol, ethanol, propanol, isopropanol, allyl alcohol, 1-butanol, isobutanol, 2-butanol, tertiary butanol, 1 N octanol, 2 N octanol, 2-ethylhexyl alcohol, decanols, linear and branched dodecyl and tridecyl alcohols, mixtures of alcohols with 16 to 18 carbon atoms such as are obtained by hydrogenation of vegetable or animal fats or fatty acids, stearyl alcohol, palmityl alcohol or oleyl alcohol.

Polyhydric alcohols, for example diols or triols, may also be used, especially those with 2 to 12 carbon atoms, such as ethylene glycol, butane-1,4-diol, butane-1,2-diol, butane-2,3-diol, 2-butene-1,4-diol, hexane-1,6-diol, octane-1,8-diol, or dodecane-1,12-diol. One of the two or more OH groups may be etherified with an alkyl group or hydroxyalkyl group with 1 to 4 carbon atoms, for example glycol monomethyl ether, glycol monoethyl ether, diglycol, methyldiglycol, diglycol butyl ether, or triglycol. The alcohol may also be substituted by other groups inert under the reaction conditions, for example dialkylamino groups of which the alkyl groups contain in all not more than 20 carbon atoms, for example N,N-diethylaminoethanol, N,N-dimethylaminoethanol or methyl-stearyl-aminoethanol. Cycloaliphatic alcohols with 5 to 12 carbon atoms in the ring, for example cyclopentanol, cyclohexanol, methylcyclohexanol, cyclooctanol, cyclododecanol, may also be used. Further, araliphatic alcohols, especially with 1 to 4 carbon atoms in the hydroxyalkyl groups, are also suitable, for example benzyl alcohol, β-phenyl-ethyl alcohol or phenylmethyl carbinol.

The reaction may be illustrated by the following reaction scheme:

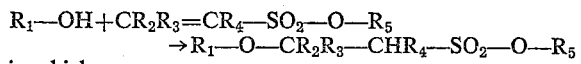

in which:

$R_1$ denotes alkyl groups with 1 to 20 carbon atoms, alkenyl groups with 3 to 20 carbon atoms, cycloalkyl groups with 5 to 12 carbon atoms in the ring, hydroxyalkyl groups with 2 to 12 carbon atoms, alkoxyalkyl groups with 3 to 12 carbon atoms, dialkylaminoalkyl groups with 4 to 23 carbon atoms in all, $R_2$ denotes hydrogen or an alkyl group with 1 to 3 carbon atoms, $R_3$ denotes hydrogen or an alkyl group with 1 to 3 carbon atoms, $R_4$ denotes hydrogen or an alkyl group with 1 to 3 carbon atoms, $R_5$ denotes alkyl groups with 1 to 6 carbon atoms, aryl groups with 6 to 15 carbon atoms, alkoxyaryl groups with 7 to 13 carbon atoms, halogenaryl groups with 6 to 12 carbon atoms or thiocyanoaryl groups with 7 carbon atoms.

The reaction between the alcohols and the esters of the vinyl sulfonic acids that may be substituted in α- and/or β-position by alkyl groups only proceeds when alkali or alkaline earth metal alcoholates or finely powdered alkali hydroxide is present in the reaction mixture. The alcoholate of that alcohol may be used which it is desired to add on; then it is sufficient first to dissolve an alkali or alkaline earth metal in the alcohol concerned. It is however, just as convenient to use other alcoholates, for example those of lower alcohols, for example sodium methylate, sodium ethylate, sodium isopropylate, potassium ethylate, or potassium tertiary butylate. It is also sufficient to use dry, finely powdered lithium hydroxide, sodium hydroxide or potassium hydroxide.

It is also possible to use quaternary ammonium bases of the formula:

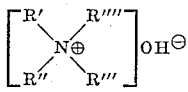

in which R′, R″ and R‴ denote alkyl groups with 1 to 3 carbon atoms and R″″ denotes aryl radicals with 6 to 10 carbon atoms, aralkyl radicals with 7 to 9 carbon atoms or cycloalkyl radicals with 5 to 12 carbon atoms in the ring, for example trimethylphenyl ammonium hydroxide, trimethyl-benzyl ammonium hydroxide, or trimethyl-cyclohexyl ammonium hydroxide.

The amount of alkaline compound should not be less than 0.02 equivalent per mole of ester and not more than 0.1 equivalent.

The alcohol is used in an excess, for example 1.3 times the stoichiometrical amount. As a rule, a considerable excess is used, for example 2 to 8 times the stoichiometrical amount; it is also possible to use an even higher excess, but this is seldom necessary. The alcohol then acts simultaneously as a diluent. Moreover in the case of polyhydric alcohols it is in this way made possible for only one OH— group to react with the vinylsulfonic acid ester which may be substituted by alkyl groups at one or both carbon atoms. The use of inert diluents, for example saturated aliphatic or cycloaliphatic or aromatic hydrocarbons, such as octane, cyclohexane, benzene or toluene, or open or cyclic ethers, such as di-n-butyl ether, tetrahydrofurane, dioxane or anisol is possible, but is only an advantage when using solid initial materials.

The reaction temperature lies between about —10° and +100° C. It is advantageous to mix the reactants at a lower temperature and then to heat them slowly.

The process may be carried out for example by dissolving the vinylsulfonic acid ester, that may be substituted by alkyl groups, in the alcohol to be added on and slowly adding small amounts of alkali metal alcoholate or finely powdered alkali hydroxide or the quaternary ammonium base and stirring constantly. The alkali or alkaline earth metal may also be dissolved in the alcohol to be reacted and the unsaturated sulfonic acid ester slowly added while mixing well. In some cases it is expedient to continue stirring for a further period, for example 2 to 24 hours, and/or heating to 80° to 100° C. after all the reactants have been added.

Working up can be carried out in various ways. For example small amounts of salts of the sulfonic acids etherified in β-position which have been formed by hydrolysis may be washed out by adding water and the organic layer subjected to fractional distillation after drying. The salts and catalyst residues may also be precipitated by adding acetone or another ketone, filtered off and then fractionated, if desired after washing the ketone with water and drying. The reaction mixture may also be distilled directly, the salts, byproducts and catalyst residues then remaining in the distillation residue.

Alkanesulfonic acid esters substituted in β-position by ether groups and having the formula $R_1$—O—$CR_2R_3$—$CHR_4$—$SO_3R_5$, in which $R_1$ to $R_5$ are as above defined, and which contain in all at least nine carbon atoms are new compounds. Those esters which contain an aryl or substituted aryl radical in the ester group and four to twenty carbon atoms in the ether group are excellent plasticizers for polyvinyl chloride and may be used like phthalic esters. Suitable substances include the cresyl ester of the alkoxyethane sulfonic acid containing 10 to 18 carbon atoms in the alkoxy radical, such as decyloxyethane sulfonic acid cresylester, branched decyloxyethane sulfonic acid cresylester, and branched tridecyloxyethane sulfonic acid cresylester.

The alkanesulfonic acid esters etherified in β-position may as a rule be distilled under reduced pressure. The esters obtained may be saponified to the corresponding free acids in the usual way, for example by means of caustic soda solution, advantageously by alcoholic caustic soda solution. These free acids of the formula $R_1$—O—$CR_2R_3$—$CHR_4$—$SO_3H$ and/or the alkali salts of these acids have surface-active properties when $R_1$ in the formula contains at least six carbon atoms.

The invention is illustrated by, but not limited to, the following examples in which parts are by weight unless otherwise specified; the ratio between parts by weight and parts by volume is the same as that between the gram and the millimeter.

*Example 1*

184 parts of vinylsulfonic acid phenyl ester is dissolved in 500 parts by volume of methanol. A total of 15 parts by volume of 28.5% (by weight) sodium methylate solution in methanol is added in the course of several hours in small portions while stirring at room temperature. The mixture is shaken with 500 parts by volume of water and the organic layer separated. The aqueous phase is extracted with 50 parts by volume of ether. The organic phase is united with the ethereal solution and dried overnight with anhydrous sodium sulfate. The ethereal solution is filtered off from the sodium sulfate and the ether evaporated. The residue is distilled at 0.2 to 0.3 mm. Hg through a short column packed with Raschig rings. 160 parts of a fraction passing over between 90° and 145° C. is obtained which according to molecular weight determination, elementary analysis and iodine number (dodecyl-mercaptan method) consists of vinylsulfonic acid phenyl ester and β-methoxyethanesulfonic acid phenyl ester. The content of methoxy compound is 135.2 parts (62.5% of the theory).

of residue, 111 parts of β-(n-octyloxy)-ethanesulfonic acid phenyl ester may be isolated (71% of the theory), boiling point 163° to 175° C. at 0.2 to 0.05 mm. Hg.

By proceeding in the way described in this example but using 500 parts by volume of other alcohols, the following results are obtained:

| Example | Alcohol | End product | Boiling point | Yield | Percent of the theory |
|---------|---------|-------------|---------------|-------|----------------------|
| 6 | n-Decyl alcohol | β-(n-decyloxy)-ethanesulfonic acid phenyl ester. | 170°-180° C., 0.2 mm. Hg. | 140 | 82 |
| 7 | Branched decyl alcohol. | β-(decyloxy)-ethanesulfonic acid phenyl ester. | 160°-172° C., 0.1-0.05 mm. Hg. | 134 | 78.5 |
| 8 | Branched tridecyl alcohol. | β-(tridecyloxy)-ethanesulfonic acid phenyl ester. | 182°-191° C., 0.1-0.05 mm. Hg. | 161 | 84 |
| 9 | Benzyl alcohol. | β-(benzyloxy)-ethanesulfonic acid phenyl ester. | 168°-182° C., 0.1-0.2 mm. Hg. | 103 | 71 |

*Example 2*

1.5 parts of sodium metal are dissolved in 400 parts by volume of isopropanol and, while stirring, 92 parts of vinylsulfonic acid phenyl ester is added at such a rate that the temperature does not rise above 40° C. The mixture is then stirred for 2½ hours at 30° to 40° C. and for another 18 hours at room temperature and shaken up twice with 300 parts by volume of water. The aqueous phase is then extracted with 50 parts by volume of ether and the ethereal solution and the organic layer are together dried with anhydrous sodium sulfate. By fractionation, 92 parts of β-(isopropyloxy)-ethanesulfonic acid phenyl ester (75.5% of the theory) of the boiling point 123° to 127° C. at 0.2 to 0.15 mm. Hg is obtained from the ethereal solution.

*Example 3*

1.5 parts of sodium metal is dissolved in 400 parts by volume of n-butanol and then 92 parts of vinylsulfonic acid phenyl ester is added so slowly that the temperature does not rise above 60° C. The mixture is stirred for 2½ hours at 55° to 60° C. after the addition of another 100 parts by volume of n-butanol, then for three hours at 30° to 40° C. and for five hours at 20° C. Working up is carried out as described in Example 2. 87 parts of β-(n-butyloxy)-ethanesulfonic acid phenyl ester (67.5% of the theory) of the boiling point 133° to 136° C. at 0.1 to 0.15 mm. Hg is obtained.

*Example 4*

1.5 parts of sodium metal is dissolved in 500 parts by volume of tertiary butanol and then 92 parts of vinylsulfonic acid phenyl ester is added while stirring. The mixture becomes brown in color. It is kept at 40° C. for four hours and at 50° C. for another hour. 200 parts by volume of acetone is added and 10 parts of brown colored β-tert.-butyloxyethanesulfonic acid sodium salt is filtered off, the acetone evaporated off and the product worked up as described in Example 2. 76 parts of β-(tert.-butyloxy)-ethanesulfonic acid phenyl ester (59% of the theory) of the boiling point 121° to 126° C. at 0.1 to 0.2 mm. Hg is obtained in addition to 17 parts of residue.

*Example 5*

1.5 parts of sodium metal is dissolved in 500 parts by volume of n-octanol and, while stirring, 92 parts of vinylsulfonic acid phenyl ester is added. The mixture is kept at 35° to 40° C. for four hours and at 50° C. for another hour. After adding 200 parts by volume of acetone, 14 parts of β-n-octyloxyethanesulfonic acid sodium salt are filtered off. The acetone is evaporated, the residue shaken twice, each time with 200 parts by volume of 30% sodium chloride solution and then once with 200 parts by volume of sodium bicarbonate solution. The combined wash waters are extracted with ether and the ethereal solution dried together with the reaction product. Besides 8 parts

*Example 10*

1.5 parts of sodium metal is dissolved in 500 parts by volume of butyl diglycol and then 92 parts of vinylsulfonic acid phenyl ester is added while stirring constantly. The mixture is kept for four hours at 40° C. and for another hour at 50° C. Then 200 parts by volume of acetone is added and the sodium salt of the butyl diglycol ether of β-oxyethanesulfonic acid formed is filtered off. The filtrate is stirred for some hours with solid finely powdered sodium hydrogen carbonate. The whole is then filtered and the filtrate distilled. 100 parts (58% of the theory) of the butyl diglycol ether of β-oxyethanesulfonic acid phenyl ester (boiling point 184° to 193° C. at 0.1 to 0.2 mm. Hg) is obtained.

*Example 11*

198 parts of vinylsulfonic acid cresyl ester is slowly added to 500 parts of allyl alcohol in which 2.5 parts of dry finely powdered caustic soda has been suspended. The mixture is kept at 40° C. for four hours and then at 50° C. for an hour. The solution is then filtered and the filtrate distilled. 214 parts of β-(allyloxy)-ethanesulfonic acid cresyl ester (84% of the theory) is obtained with a boiling point of 135° to 142° C. at 0.1 mm. Hg.

*Example 12*

By proceeding as described in Example 11 but using 500 parts of butane-diol-1,4, 3 parts of sodium hydroxide powder and 198 parts of vinylsulfonic acid cresyl ester, 217 parts of β-(4-hydroxybutyloxy)-ethanesulfonic acid cresyl ester (76% of the theory) is obtained with a boiling point of 175° to 193° C. at 0.1 to 0.2 mm. Hg.

*Example 13*

4 parts of sodium hydroxide powder is stirred into 500 parts of nonyl alcohol, the whole cooled to 0° C. and 122 parts of vinylsulfonic acid methyl ester allowed to flow in within 30 minutes while stirring. The mixture is further stirred for 3½ hours at 0° C., then for another three hours at room temperature. The precipitate is filtered off and the filtrate distilled. 208 parts of β-(nonyloxy)-ethanesulfonic acid methyl ester (78% of the theory) is obtained with a boiling point of 120° to 145° C. at 0.1 to 0.2 mm. Hg.

*Example 14*

By using 500 parts of nonyl alcohol, 198 parts of vinylsulfonic acid cresyl ester and 0.1 equivalent (equal to 5 parts) of calcium methylate and proceeding otherwise as described in Example 5, 137 parts of β-(nonyloxy)-ethanesulfonic acid cresyl ester (40% of the theory) is obtained with a boiling point of 155° to 170° C. at 0.1 mm. Hg.

Example 15

By using 500 parts of 2-ethylhexanol-(1), 198 parts of vinylsulfonic acid cresyl ester and 0.06 equivalent (equal to 2.4 parts) of finely powdered sodium hydroxide and proceeding as described in Example 11, 275 parts of β-(2'-ethyl-n-hexyl-1'-oxy)-ethanesulfonic acid cresyl ester (84% of the theory) is obtained.

Example 16

3 parts of sodium hydroxide powder is stirred into 460 parts of cyclohexanol and at 0° to −5° C. 198 parts of vinylsulfonic acid cresyl ester is allowed to flow in within 30 minutes, the reaction mixture partly solidifying on the wall of the reaction vessel. The reaction mixture is allowed to reach room temperature within two hours while stirring and during another three hours the temperature is raised to 90° C. After cooling to room temperature, the mixture is worked up as described in Example 11. The yield is 249 parts of β-(cyclohexyloxy)-ethanesulfonic acid cresyl ester (83% of the theory) with a boiling point of 160° to 171° C. at 0.2 mm. Hg.

Example 17

15 parts of sodium hydroxide powder is stirred into 1000 parts of branched decyl alcohol and at 0° C. 990 parts of vinyl-sulfonic acid cresyl ester is allowed to flow in during 45 minutes. The whole is stirred for another hour at 0° C., heated to room temperature in the course of an hour and to 100° C. in the course of another hour and kept for an hour at this temperature. The mixture is then cooled to room temperature and worked up as described in Example 11.

The yield is 1600 parts of β-(branched-decyloxy)-ethanesulfonic acid cresyl ester (90% of the theory) with a boiling point of 170° to 184° C. at 0.02 to 0.05 mm. Hg, 200° to 214° C. at 5 mm. Hg and 224° to 232° C. at 10 mm. Hg.

Example 18

265 parts of $C_{16-18}$-alcohol from sperm oil is dissolved in 400 parts by volume of ether while stirring at about 30° C. Then 2 parts of sodium hydroxide powder is added and at 35° to 40° C. 122 parts of vinylsulfonic acid methyl ester is added during 30 minutes. The whole is stirred for six hours at 35° to 40° C., 1 part more of sodium hydroxide powder being slowly added. The ether is removed in a water pump vacuum. The residue consists of crude β-($C_{16-18}$-alkoxy-ethanesulfonic acid methyl ester from which by saponification in ethanol with sodium hydroxide 263 parts of β-($C_{16-18}$-alkoxy)-ethanesulfonic acid sodium salt (68% of the theory) is recovered.

Example 19

0.5 part of sodium hydroxide powder is suspended in 50 parts of n-octanol, cooled to 0° C. and 66 parts of 1-propene-(1)-sulfonic acid phenyl ester added so that the temperature does not rise above 40° C. The whole is then stirred for another eight hours at room temperature and worked up as described in Example 11.

The yield is 64 parts of 2-methyl-2-(n-octyloxy)-ethanesulfonic acid phenyl ester (58% of the theory) of the boiling point 162° to 172° C. at 0.05 mm. Hg.

Example 20

A suspension of 2.5 parts of sodium hydroxide powder in 400 parts of isotridecanol is stirred at 10° to 20° C. while 212 parts of one of the vinylsulfonic acid xylenol esters set out in the following table is added. The mixture is stirred for another four hours at room temperature, filtered from solids and the filtrate subjected to fractional distillation. The results are comprised in the following table:

| Ester used | β-alkoxyethanesulfonic acid ester obtained | Yield | Boiling range |
|---|---|---|---|
| 2,4-dimethyl-phenyl. | β-tridecyloxy-ethanesulfonic (2,4-dimethylphenyl) ester. | 277 parts (67.2% of the theory) | 179°–196° C., 0.2 mm. Hg. |
| 3,5-dimethyl-phenyl. | β-tridecyloxy-ethanesulfonic (3,5-dimethylphenyl) ester. | 246 parts (59.7% of the theory). | 175°–200° C., 0.2 mm. Hg. |
| 3,4-dimethyl-phenyl. | β-tridecyloxy-ethanesulfonic (3,4-dimethylphenyl) ester. | 356 parts (86.4% of the theory). | 190°–213° C., 0.2 mm. Hg. |

Example 21

400 parts of isotridecanol and 120 parts of vinylsulfonic acid tert.-butylphenyl ester are reacted in the presence of 2.5 parts of sodium hydroxide powder as in Example 20. 105 parts (47.6% of the theory) of β-isotridecyloxyethanesulfonic acid tert.-butylphenyl ester is obtained with the boiling point 170° to 207° C. at 0.05 to 0.1 mm. Hg.

Example 22

198 parts of N-methyl-N-β-hydroxyethyl-m-toluidine is mixed at 0° C. with 3 parts of sodium hydroxide powder. 198 parts of vinylsulfonic acid cresyl ester is stirred into this mixture within 15 minutes at 0° to +5° C. After half an hour, the whole is heated to room temperature and after four hours to about 100° C., kept at this temperature for 9 hours and then cooled to 0° C. and filtered. The filtrate is freed from first runnings (up to 150° C. flask temperature at a pressure of 0.1 mm. Hg). 235 parts of crude adduct is obtained as residue (about 65% of the theory).

Example 23

To a number of batches, each of 300 parts of allyl alcohol, 220 parts of each of the following vinylsulfonic acid esters and 3 to 4 parts of sodium hydroxide are added and the whole stirred for three hours at 40° C. Stirring is continued for another 8 hours at room temperature, the residue filtered off and the filtrate distilled.

| Vinylsulfonic acid ester used | β-allyloxy-ethanesulfonic acid ester obtained | | |
|---|---|---|---|
| | B.P. (0.1 mm.), ° C. | Parts | Percent of the theory |
| Vinylsulfonic acid-2-chlorophenyl ester. | 130–150 | 300 | 79 |
| Vinylsulfonic acid-3-chlorophenyl ester. | 130–150 | 250 | 66 |
| Vinylsulfonic acid-4-chlorophenyl ester. | 130–150 | 300 | 79 |

Example 24

3 parts of sodium hydroxide powder is stirred in small portions into a mixture of 117 parts of vinylsulfonic acid α-naphthyl ester and 350 parts of cyclohexanol at 40° to 45° C. during three hours. The whole is allowed to react further for an hour at 80° C, then cooled to room temperature and shaken five times with 200 parts by volume of water. The organic layer is dried over sodium sulfate and freed by distillation from first runnings (up to 150° C. flask temperature at 1 mm Hg). The residue is crude β-cyclohexyloxyethanesulfonic acid α-naphthyl ester (160 parts of crude product, yield almost quantitative).

*Analysis.*—Found: 64.2% C, 6.6% H, 19.2% O, 9.6% S. Calculated: 66.3% C, 6.1% H, 17.9% O, 9.5% S.

Example 25

A mixture of 400 parts of n-decanol and 198 parts of vinylsulfonic acid cresyl ester is stirred at room temperature and a total of 10 parts of cyclohexyltrimethyl ammonium hydroxide is added in small portions during ten hours. The product is then washed five times, each time with 200 parts by volume of water, the organic layer dried with sodium sulfate and distilled. 114 parts (32% of the theory) of β-n-decyloxyethanesulfonic acid cresyl ester is obtained with a boiling point of 192° to 217° C at 0.3 mm. Hg.

By working in an analogous manner but using phenyltrimethyl ammonium hydroxide as catalyst, 95 parts (27% of the theory) of ester is obtained with the boiling range 183° to 215° C. at 0.2 mm. Hg.

When using isodecanol instead of n-decanol and benzyltrimethyl ammonium hydroxide as the basic catalyst, 106 parts (equivalent to 30% of the theory) of β-isodecyloxyethanesulfonic acid cresyl ester of the boiling range 165° to 181° C. at 0.1 mm. Hg is obtained under otherwise identical conditions.

Example 26

214 parts of vinylsulfonic acid guaiacol ester, 500 parts of n-decanol and 4 parts of sodium hydroxide powder are stirred together for eight hours at 40° C. the residue is filtered off by suction and the filtrate distilled. 244 parts (69% of the theory) of β-n-decyloxyethanesulfonic acid guaiacol ester of the boiling range 180° to 220° C. at 0.4 to 0.6 mm. Hg is obtained.

Example 27

198 parts of vinylsulfonic acid cresyl ester, 600 parts of N-dimethylethanolamine and 3 parts of sodium hydroxide powder are treated as described in example 26. After distilling off the first runnings up to a flask temperature of 150° C. at a pressure of 3 mm Hg, 275 parts of residue remains behind. After washing five times, each time with 200 parts of water and then drying over sodium sulfate, 190 parts of adduct (crude yield 70%) of the formula:

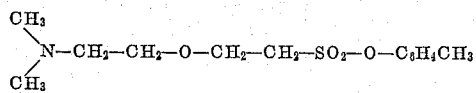

is obtained.

We claim:
1. A compound of the formula

$$R_1\text{—O—}CH_2R_3\text{—}CHR_4\text{—}SO_2O\text{—}R_5$$

containing at least 9 carbon atoms and in which:
   $R_1$ denotes a member selected from the group consisting of alkyl with 1 to 20 carbon atoms, alkenyl with 3 to 20 carbon atoms, cycloalkyl with 5 to 12 carbon atoms in the ring, hydroxyalkyl with 2 to 12 carbon atoms, alkoxyalkyl with 3 to 12 carbon atoms, and dialkylaminoalkyl with 4 to 23 carbon atoms;
   $R_2$, $R_3$ and $R_4$ each denote a member selected from the group consisting of hydrogen and alkyl with 1 to 3 carbon atoms; and
   $R_5$ denotes a member selected from the group consisting of phenyl, naphthyl, 5,6,7,8-tetrahydronaphthyl, and phenyl and naphthyl substituted by from 1 to 3 members selected from the group consisting of alkyl with 1 to 3 carbon atoms, alkoxy with 1 to 3 carbon atoms, halogen and thiocyanate.

2. A compound of the formula $$R_1\text{—O—}CH_2CH_2\text{—}SO_3\text{—}R_5$$

in which $R_1$ denotes an alkyl group with 1 to 20 carbon atoms and $R_5$ denotes an aryl group with 6 to 12 carbon atoms.

3. A compound of the formula $$R_1\text{—O—}CH_2CH_2\text{—}SO_3\text{—}R_5$$

in which $R_1$ denotes an alkyl group with 1 to 20 carbon atoms and $R_5$ denotes an alkoxy-aryl group with 7 to 13 carbon atoms.

4. A compound of the formula $$R_1\text{—O—}CH_2CH_2\text{—}SO_3\text{—}R_5$$

in which $R_1$ denotes an alkyl group with 1 to 20 carbon atoms and $R_5$ denotes a halogen aryl group with 6 to 12 carbon atoms.

5. Dodecyloxyethanesulfonic acid cresyl ester.
6. Branched decyloxyethanesulfonic acid cresyl ester.
7. Branched tridecyloxyethanesulfonic acid cresyl ester.
8. A process for the production of alkanesulfonic acid esters of the formula $$R_1\text{—O—}CR_2R_3\text{—}CHR_4\text{—}SO_2O\text{—}R_5$$

in which
   $R_1$ denotes a member selected from the group consisting of alkyl with 1 to 20 carbon atoms, alkenyl with 3 to 20 carbon atoms, cycloalkyl with 5 to 12 carbon atoms in the ring, hydroxyalkyl with 2 to 12 carbon atoms, alkoxyalkyl with 3 to 12 carbon atoms, and dialkylaminoalkyl with 4 to 23 carbon atoms;
   $R_2$, $R_3$ and $R_4$ each denote a member selected from the group consisting of hydrogen and alkyl with 1 to 3 carbon atoms; and
   $R_5$ denotes a member selected from the group consisting of alkyl with 1 to 6 carbon atoms, phenyl, naphthyl, 5,6,7,8-tetrahydronaphthyl, and phenyl and naphthyl substituted by from 1 to 3 members selected from the group consisting of alkyl with 1 to 3 carbon atoms, alkoxy with 1 to 3 carbon atoms, halogen and thiocyanate,
which process comprises:
   mixing a vinylsulfonic acid ester of the formula $CR_2R_3=CR_4\text{—}SO_2O\text{—}R_5$, in which $R_2$, $R_3$, $R_4$ and $R_5$ are as previously defined, with a stoichiometric excess of an alcohol of the formula $R_1OH$, in which $R_1$ is as previously defined, in the presence of 0.02 to 0.1 equivalent of a compound selected from the group consisting of alkali and alkaline earth metal alcoholates of the alcohol reactant $R_1OH$, alkali and alkaline earth metal alcoholates of alkanols with 1 to 4 carbon atoms, alkali metal hydroxides and quaternary ammonium bases of the formula

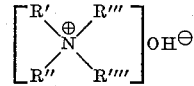

in which R′, R″ and R‴ each denote alkyl with 1 to 3 carbon atoms and R⁗ denotes a hydrocarbon radical selected from the group consisting of aryl of 6 to 10 carbon atoms, aralkyl with 7 to 8 carbon atoms and cycloalkyl with 5 to 12 carbon atoms in the ring, at a temperature between −10° C. and +100° C., and separating said alkanesulfonic acid ester formed thereby.

9. A process as claimed in claim 8 wherein said reaction is carried out in an inert organic solvent.

(References on following page)

References Cited by the Examiner

UNITED STATES PATENTS

| | | | |
|---|---|---|---|
| 1,985,747 | 12/34 | Steindorff et al. | 260—512 |
| 2,094,489 | 9/37 | Hueter et al. | 260—513 |
| 2,474,350 | 6/49 | Eilerman | 260—456 |

OTHER REFERENCES

Chapman et al.: J. Chem. Soc. (London), vol. of 1950, pp. 579–585.

Johary et al.: J. Chem. Soc. (London), vol. of 1955, pp. 1307–1311.

Kohler et al.: Am. Jour. Chem., vol. 20, page 690 (1898).

Wagner et al.: Synthetic Organic Chemistry, page 232 (1953).

CHARLES B. PARKER, *Primary Examiner.*

JOSEPH P. BRUST, *Examiner.*